United States Patent [19]

Scherzinger

[11] Patent Number: 4,895,470

[45] Date of Patent: Jan. 23, 1990

[54] DRIVE MECHANISM FOR GENERATOR SHAFTS

[75] Inventor: William M. Scherzinger, Brick, N.J.

[73] Assignee: Allied-Signal Inc., Morris Township, Morris County, N.J.

[21] Appl. No.: 332,184

[22] Filed: Apr. 3, 1989

[51] Int. Cl.$^4$ .............................................. F16B 1/00
[52] U.S. Cl. ..................................... 403/25; 403/348; 403/359
[58] Field of Search ................... 403/348, 349, 359, 1, 403/24, 25

[56] References Cited

U.S. PATENT DOCUMENTS

| | | | |
|---|---|---|---|
| 4,801,232 | 1/1989 | Hempel | 403/348 X |
| 4,810,126 | 3/1989 | Lengel | 403/359 |

*Primary Examiner*—Andrew V. Kundrat
*Attorney, Agent, or Firm*—Glen M. Diehl; Howard G. Massung

[57] ABSTRACT

A drive mechanism which couples a generator shaft to a gear box or other source of mechanical power is disclosed. The drive mechanism is an assembly of a drive shaft, a rod, a bar shaped nut and a compression spring. The rod is inserted into a bore in the drive shaft with the compression spring about the rod. The bar is secured to a portion of the rod which extends from the drive shaft. The rod is adapted so that it may be depressed and rotated within the bore in the drive shaft such that the compression spring exerts a force on a head in the rod opposing the depression. A retaining mechanism is inserted the generator shaft for receiving the bar shaped nut such that the drive mechanism is retained within the generator shaft.

12 Claims, 2 Drawing Sheets

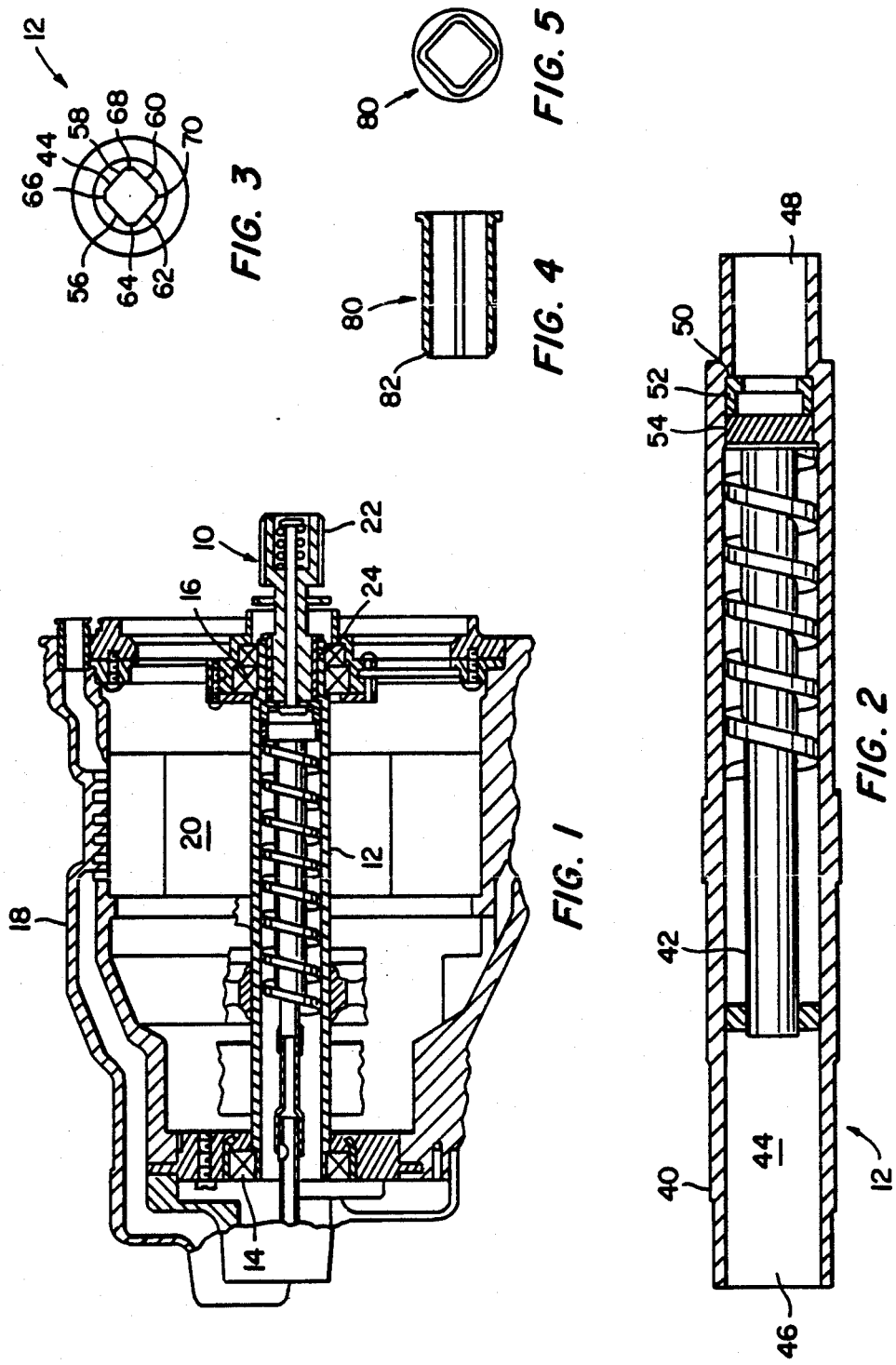

DRIVE MECHANISM FOR GENERATOR SHAFTS

BACKGROUND OF THE INVENTION

This invention relates to apparatus for coupling a generator shaft to a gear box. More specifically, it relates to generator shaft drive mechanisms which are quickly and easily disconnected from the shaft being driven.

In a generator, a gear box or other source of mechanical power transmits its power to a generator shaft to cause the rotation thereof through a drive mechanism. The drive mechanism typically has a splined end which is connected to the gear box or other source of mechanical power. The means used by the prior art to couple the drive mechanism to the shaft have been complicated, requiring difficult procedures and special tools for connecting and disconnecting the drive mechanism from the shaft. As a result, the shaft and the drive mechanism have not been field replaceable, necessitating the removal of the generator for repairs or servicing to be performed at a depot.

One prior art drive mechanism coupled to generator shafts by means of a screw extending from a key slot in the generator shaft. The drive mechanism had a bore which received the screw when the drive mechanism was inserted into the shaft. When the drive mechanism was fully inserted into the generator shaft, a portion of the screw extended from the drive mechanism. The drive mechanism was retained within the generator shaft by a nut which was threaded onto the portion of the screw extending from the drive mechanism. This arrangement was difficult to disconnect because of the inaccessibility of the head on the screw within the generator shaft. As a result, disconnecting the drive mechanisms necessitated special tools as well as difficult and time consuming removal procedures. Further problems encountered in disconnecting the drive mechanism from the generator shaft included the nut freezing on the screw.

Since the drive mechanism is replaced frequently due to worn splines, a drive mechanism with a long life which is able to withstand the environment in which aircraft generators operate and is simple to install and replace, is needed.

SUMMARY OF THE INVENTION

The present invention provides a drive mechanism for coupling a bored generator shaft to a gear box or other source of mechanical power so as to cause the rotation of the generator shaft. The drive mechanism is an assembly which includes a drive shaft, a rod, a bar shaped nut and a compression spring. Additionally, a retaining mechanism which is inserted into the bore of the generator shaft for retaining the drive shaft is provided.

The drive shaft has a bore which extends axially from an opening at a first end to an opening at a second end and a cavity at the first end. The second end of the drive shaft is adapted to fit within a portion of the bore of the generator shaft so as to cause the generator shaft to rotate when the drive shaft rotates. In a preferred embodiment, the periphery of the second end has a polygon profile to match the profile provided by the portion of the bore of the generator shaft in which the drive shaft is inserted. A bushing having the same polygon profile is inserted into the generator shaft and receives the drive shaft. The bushing prevents metal to metal contact between the shaft and the drive mechanism.

The rod is adapted to fit within the bore in the drive shaft such that a portion of the rod extends from the second opening. The road has a head which is within the cavity. The head is preferably slotted, so that the rod can be depressed within the cavity and rotated by means of a screw driver. The bar is secured to the portion of the rod extending from the second opening preferably by means of threading and tack welding.

The compression spring fits within the cavity at the first end about the rod and in contact with the head. When the rod is depressed into the cavity the spring goes into compression and exerts a force against the head causing the bar shaped nut be pulled back towards the drive mechanism.

The retaining mechanism is secured within the bore of the generator shaft. It has a recessed face with a hollow section through which the bar shaped nut is inserted when the rod is depressed. The recessed face has recessed cavities which are offset from the hollow section in which the bar shaped nut rests when it is properly positioned and when the rod is no longer depressed, as a result of the spring exerting a force on the head of the rod.

It is an object of the present invention to provide a drive mechanism which is simple to install onto a generator shaft and to disconnect from the generator shaft.

It is another object of the present invention to provide a drive mechanism which is positively retained by the generator shaft.

It is a further object of the invention to provide a drive mechanism which is field replaceable with no special tools or fixtures and no disassembly of the generator.

BRIEF DESCRIPTION OF THE DRAWINGS

FIG. 1 illustrates a generator having the drive mechanism of the present invention connected to its shaft;

FIGS. 2 and 3 illustrate sectional and axial views, respectively, of the shaft assembly to which the drive mechanism of the present invention is coupled;

FIGS. 4 and 5 illustrate axial and sectional views, respectively, of the bushing inserted into the bore of the shaft in accordance with a preferred embodiment;

DESCRIPTION OF THE PREFERRED EMBODIMENT

Figure 6:
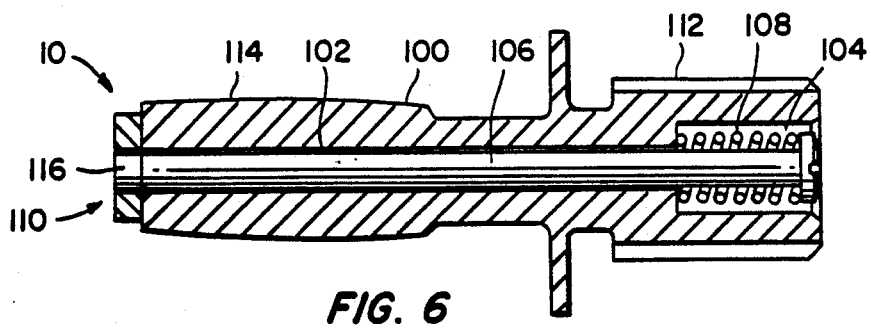
FIG. 6 illustrates the drive mechanism assembly of the present invention.

FIG. 1 illustrates a generator which utilizes a drive mechanism assembly 10, in accordance with a preferred embodiment of the present invention, to couple mechanical power from a gear box or from other mechanical power sources to a shaft 12 to cause the rotation of the shaft 12. The shaft 12 is journaled in the bearings 14 and 16 for rotation in the housing 18. A rotor 20 is mounted on the shaft 12 for rotation therewith. The drive mechanism assembly 10 has a first end 22 which is outside of the generator housing 18 and is configured to mate with the mechanical interface provided by the gear box or by other mechanical power sources so as to receive power therefrom. Typically in an aircraft generator, this requires the first end 22 to be splined according to a number of standard interfaces such a STANDARD ANS B92.1. Alternatively, any other configuration to mechanically mate with the power source can be provided at the first end 22. At a second end 24 of the drive mechanism assembly 10 an interface is provided to mate with the shaft 12 to cause the rotation of the shaft assembly 12 and to secure the drive mechanism 10 to the shaft assembly 12.

FIG. 2 illustrates the shaft assembly 12 which includes a shaft 40 and a bored rod 42 which is secured within an axial bore 44 in the shaft 40 for rotation therewith. The shaft 40 has two open ends 46 and 48. A lip 50 is provided in the bore 44 near the end 48. During the assembly of the shaft assembly 12, retaining mechanism 52 is inserted into the bore 44 at the open end 46 before the rod 42 is inserted. The retaining mechanism 52 is pushed into the bore 44 until it contacts the lip 50. A seal plug 54 is also inserted into the bore 44 at the open end 46 prior to the bored rod 42 being mounted in the shaft assembly 12. The retaining mechanism 52 and the seal plug 54 are secured within the shaft 40 by means of a shrink fit. The seal plug 54 prevents oil, which in a preferred embodiment, is circulated through the shaft assembly 12 to provide cooking for the generator, from exiting the end 48 of the shaft 40. The drive mechanism of the present invention can also be used with air cooled generators in which case the seal plug is not needed.

In the shaft 40, the portion of the bore 44 extending from the lip 50 to the opening 48 is adapted to receive the end 24 of the drive mechanism assembly 10. FIG. 3 illustrates a preferred shape of the receiving section of the bore 44. It has a polygon profile which has eight sides, four long sides 56, 58, 60 and 62 and four short sides 64, 66, 68 and 70. The periphery of the end 24 of the drive mechanism is configured with a similar polygon profile, so that when the drive mechanism assembly 10 is inserted into the shaft assembly 12 and then rotates, a force is exerted against the inner walls of the section of the bore 44 having the polygon profile, thereby causing the shaft assembly 12 to rotate.

FIGS. 4 and 5 illustrate a section view and an axial view, respectively, of a bushing 80 which, in a preferred embodiment, is press fit into the end 48 of the shaft 40. The bushing 80 prevents metal to metal contact between the shaft 40 and the drive mechanism assembly 10, thereby preventing excessive wearing on either part. The bushing 80 is preferably fabricated with Amoco Torlon 4203, which is a self-lubricating material. The periphery of the bushing 80, illustrated in FIG. 5, has a profile which mates with the polygon profile of the portion of the bore 44 so that the bushing 80 can be press fit into the shaft 40. The inner part of the bushing 80 has the same polygon profile as the end 24 of the drive mechanism 10, so that the bushing 80 can receive the drive mechanism 10. The end 82 which is inserted into the shaft 40 is chamfered to simplify assembly.

FIG. 6 illustrates a section view of the drive mechanism assembly 10 in accordance with a preferred embodiment of the present invention. The drive mechanism assembly 10 comprises a drive shaft 100 having a bore 102 and a cavity 104, a rod 106, spring 108 and a nut 110. The drive shaft 100 is preferably fabricated from steel. As before mentioned, the end 112 of the 100 is typically splined to mate with a gear box. Any interface needed for a particular gear box or any other source of mechanical power can be provided at the end 112.

The other end 114 of the drive shaft 100 provides the interface to the shaft 12 through which power from the gear box is transferred to the shaft 12. The periphery of the end 114 has the same shape as the polygon profile of the receptacle into which it is inserted. In the preferred embodiment, the receptacle receiving the end 112 is the bushing 80 which is inserted into the shaft assembly 12. The dimensions of the polygon profile of the section 114 of the drive shaft 100 are, therefore, somewhat less than those of the interior polygon profile of the bushing 80, so as to provide a clearance fit. When the drive mechanism 10 is rotated, therefore, a force will be exerted on the interior walls of the bushing 80 and on the interior walls of the shaft 40, causing the rotation of the shaft assembly 12.

Figure 7:
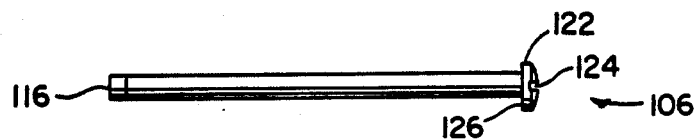
FIG. 7 illustrates the rod used in the drive mechanism assembly of FIG. 6.
Figure 8:
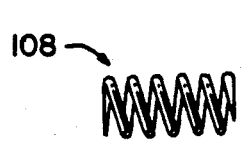
FIG. 8 illustrates the bar shaped nut which is secured to the end of the rod in the drive mechanism assembly of FIG. 6.

FIG. 8 illustrates the compression spring 108 which fits into the cavity 104. FIG. 7 illustrates the rod 106 which is inserted into the bore 102 in the shaft drive 100 such that the spring 108 is disposed about the rod 106. A head 122 on the rod 106 retains the spring 108 in the cavity 104.

Figure 9:
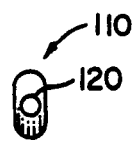
FIG. 9 illustrates the compression spring used in the drive mechanism assembly of FIG. 6.

A portion 116 of the rod 106 extends from the shaft drive 100. A bar shaped nut 110 having a hole 120 in which the portion 116 fits is illustrated in FIG. 9. The nut 110 is secured to the portion 116 of the rod 106 extending from the shaft drive 100. In a preferred embodiment, the portion 116 of the rod 106 is threaded as is the inner surface of the hole 120. The nut 118 is threaded onto the rod 106 It is further preferable to tack weld the nut 110 onto the rod 106 to further secure it.

Figure 10:
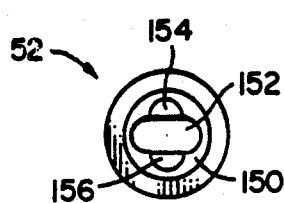
FIGS. 10 and 11 illustrate axial and sectional views, respectively, of the retaining mechanism inserted into the shaft assembly of FIG. 2 to retain the drive mechanism assembly of FIG. 6.
Figure 11:
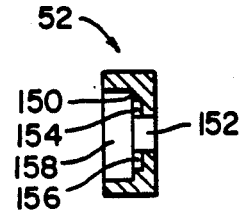

FIGS. 10 and 11 illustrate the retaining mechanism 52 used in the shaft assembly 12 to retain the drive mechanism assembly 10 therein. The retaining mechanism 52 comprises a recessed face 150 having a hollow section 152 and recessed cavities 154 and 156. Referring to FIGS. 6 and 11, the retention of the drive mechanism 10 in the shaft assembly 12 will be explained.

The rod 106 is adapted to be depressed and rotated within the bore 102 and the cavity 104 by means of a tool. In a preferred embodiment, a slot 124 is provided in the head 122 of the rod 106 in which a screw driver can be inserted so as to depress and rotate the rod 106. When the drive mechanism assembly 10 is inserted into the bore 44 of the shaft 40, the screw driver is used to depress the rod 106 in the drive shaft 100. Since the underside 126 of the head 122 contacts the spring 108, the spring 108 opposes the depression of the rod 106. The rod 106 is then rotated, thereby rotating the nut 110 until it fits into the hollow section 152 in the retaining mechanism 52, which is adapted to receive it. The rod 106 is further depressed so that the nut 110 extends into the cavity 158 in the retaining mechanism 52. The rod 106 is further rotated by turning the screw driver until the nut 110 fits into the recessed cavities 154 and 156. When the screw driver is released, the force of the spring 108 against the underside 126 of the head 122 causes the rod 106 to pull the bar shaped nut 110 into the cavities 124 and 126, thereby positively retaining the drive mechanism 10 within the shaft assembly 12.

I claim:

1. A drive mechanism for coupling a generator shaft having a shaped bore to a source of rotational power, comprising:
- a drive shaft having an axial bore extending from an opening at a first end to an opening at a second end and a cavity at said opening at said first end, said first end adapted for interconnection with the source of rotational power and said second end of said drive shaft adapted to fit within the bore of the generator shaft so as to cause the generator shaft to rotate when said drive shaft rotates;
- a rod adapted to fit within said bore in said drive shaft such that a portion of said rod extends from said second opening and having a head adapted to allow said rod to be rotated and depressed into said cavity;
- a compression spring adapted to fit within said cavity at said first end about said rod and in contact with said head such that when said rod is depressed into said cavity said spring goes into compression and exerts a force against said head;
- a bar securd to said portion of said rod extending from said second opening; and
- retaining means secured within the bore of the generator shaft for receiving said bar when said rod is depressed and for retaining the drive mechanism within the generator shaft.

2. The drive mechanism as claimed in claim 1, further comprising a bushing adapted to fit within the bore of the generator shaft in which said second end of said drive shaft is inserted.

3. The drive mechanism as claimed in claim 2, wherein said bushing is fabricated from Amoco TORLON 4203.

4. The drive mechanism as claimed in claim 1, wherein said retaining means has a recessed face with a hollow section through which said bar is received when said rod is depressed and a recessed cavity in said recessed face which is offset from said hollow section in which said bar rests.

5. The drive mechanism as claimed in claim 1, wherein said bar is threaded onto said rod and tack-welded thereon.

6. The drive mechanism as claimed in claim 2, wherein said bushing is fabricated from a self-lubricating material.

7. The drive mechanism as claimed in claim 6, wherein said bushing is fabricated from Amoco TORLON 4203.

8. The drive mechanism as claimed in claim 1, wherein the generator shaft bore and said second end of said drive shaft have mating polygon shapes.

9. The drive mechanism as claimed in claim 1, wherein said first end of said drive shaft is splined.

10. A drive mechanism for coupling a generator shaft having a shape bored to a source of rotational power, comprising:
- a bushing adapted to fit within the bore of the generator shaft;
- a drive shaft having an axial bore extending from an opening at a first end to an opening at a second end and a cavity at said opening at said first end, said first end adapted for inteconnection with the source of rotational power and said second end adapted to fit within said bushing so as to cause said bushing and the generator shaft to rotate when said drive shaft rotates;
- a rod adapted to fit within said bore in said drive shaft such that a portion of said rod extends from said second opening and having a head adapted to allow said rod to be rotated and depressed into said cavity;
- a compression spring adapted to fit within said cavity at said first end about said rod and in contact with said head such that when said rod is depressed into said cavity said spring goes into compression and exerts a force against said head;
- a bar secured to said rod; and
- a retainer secured within the bore of the generator shaft having a face with a hole therein and a recessed area offset from said hole, said hole adapted for receipt of said bar when said rod is depressed and said recessed area adapted for receipt of said bar when said rod is rotated and released for retaining the drive mechanism within the generator shaft.

11. The drive mechanism as claimed in claim 10, wherein said bushing is fabricated from a self-lubricating material.

12. The drive mechanism as claimed in claim 11, wherein said bushing is fabricated from Amoco TORLON 4203.

* * * * *